(12) United States Patent
Zynda et al.

(10) Patent No.: US 8,434,826 B2
(45) Date of Patent: May 7, 2013

(54) STRUCTURE FOR A VEHICLE SEAT

(75) Inventors: Martin Zynda, Burscheld (DE); Stefan Josten, Rommerskirchen (DE); Stefan Funk, Leichlingen (DE); Bernd Engels, Remscheid (DE); Andreas Hansen, Waldenbuch (DE)

(73) Assignee: Johnson Controls Technology Company, Holland, MI (US)

( * ) Notice: Subject to any disclaimer, the term of this patent is extended or adjusted under 35 U.S.C. 154(b) by 463 days.

(21) Appl. No.: 12/669,472

(22) PCT Filed: Jul. 14, 2008

(86) PCT No.: PCT/EP2008/005729
§ 371 (c)(1),
(2), (4) Date: Jul. 22, 2010

(87) PCT Pub. No.: WO2009/010257
PCT Pub. Date: Jan. 22, 2009

(65) Prior Publication Data
US 2010/0276979 A1 Nov. 4, 2010

(30) Foreign Application Priority Data

Jul. 18, 2007 (DE) .......... 10 2007 033 774
Nov. 9, 2007 (DE) .......... 10 2007 053 961

(51) Int. Cl.
*A47C 7/02* (2006.01)
*B29C 44/04* (2006.01)
*B68G 7/00* (2006.01)

(52) U.S. Cl.
USPC ............ 297/452.2; 297/DIG. 1; 264/45.1; 29/91.1

(58) Field of Classification Search ........... 297/DIG. 1, 297/452.22, 452.32, 452.37, 452.53, 452.57, 297/463.1, 452.2; 264/45.1; 29/91.1
See application file for complete search history.

(56) References Cited

U.S. PATENT DOCUMENTS

| 3,880,467 | A | * | 4/1975 | Tischler | 297/452.53 |
|---|---|---|---|---|---|
| 4,577,907 | A | * | 3/1986 | Talmon et al. | 297/452.12 |
| 5,067,772 | A | * | 11/1991 | Koa | 297/452.55 |
| 5,624,160 | A | | 4/1997 | Koch et al. | |

(Continued)

FOREIGN PATENT DOCUMENTS

| DE | 2303289 A1 | 8/1974 |
|---|---|---|
| DE | 3636113 A1 | 4/1987 |

(Continued)

OTHER PUBLICATIONS

International Search Report for application No. PCT/EP2008/005729 mailed Oct. 1, 2008.

(Continued)

*Primary Examiner* — Milton Nelson, Jr.
(74) *Attorney, Agent, or Firm* — Fletcher Yoder P.C.

(57) ABSTRACT

A vehicle seat includes a backrest and a seat part, at least one of which has a structural element with a cavity. The cavity is formed by a base plate and at least two profiles secured to the base plate. A corner region of the two profiles has provided in it a filling configured to influence the stability and/or the deformation behavior of the backrest and/or the seat part. The filling has a foam support and a foam material at least partially surrounding the foam support.

10 Claims, 2 Drawing Sheets

U.S. PATENT DOCUMENTS

Figure 1:
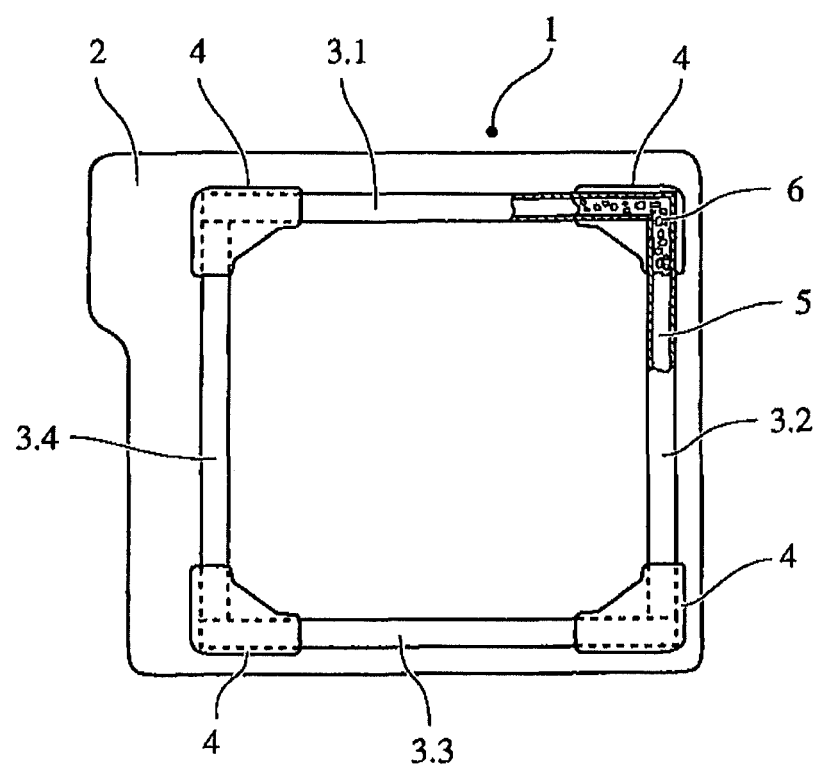

| | | | |
|---|---|---|---|
| 6,233,826 B1 * | 5/2001 | Wycech | 29/897.1 |
| 6,419,305 B1 | 7/2002 | Larsen | |
| 6,941,719 B2 * | 9/2005 | Busseuil et al. | 52/846 |

FOREIGN PATENT DOCUMENTS

| | | |
|---|---|---|
| DE | 3714588 A1 | 11/1988 |
| DE | 4028895 C1 | 2/1992 |
| DE | 4208150 A1 | 9/1993 |
| DE | 19727907 A1 | 5/1998 |
| DE | 29812841 U1 | 10/1998 |
| DE | 19746164 A1 | 4/1999 |
| DE | 19817279 A1 | 10/1999 |
| DE | 10142981 B4 | 3/2003 |
| DE | 10214476 A1 | 3/2003 |
| DE | 10230562 C1 | 9/2003 |
| DE | 10250218 A1 | 5/2004 |
| DE | 10321289 A1 | 12/2004 |
| DE | 202004019560 U1 | 3/2005 |
| DE | 102004043860 A1 | 3/2006 |
| DE | 102005043084 A1 | 3/2007 |
| DE | 102006014538 B3 | 5/2007 |
| EP | 0893332 A | 1/1999 |
| EP | 1591224 A1 | 11/2005 |
| JP | 11165355 A | 6/1899 |
| JP | 01 069309 A | 3/1989 |
| JP | 20060212441 | 8/2006 |
| WO | 0189875 A | 11/2001 |
| WO | 0202292 A1 | 1/2002 |
| WO | 2005/002950 A | 1/2005 |

OTHER PUBLICATIONS

German Search Report of Apr. 10, 2008—DE102007053961 1st Office Action, pp. 1-5.
German Search Report of Sep. 9, 2011—DE102007053961 2nd Office Action, 5 pgs.

* cited by examiner

STRUCTURE FOR A VEHICLE SEAT

CROSS REFERENCE TO RELATED APPLICATIONS

This application claims priority from and the benefit of PCT Application No. PCT/EP2008/005729, filed on Jul. 14, 2008; German Patent No. DE 10 2007 033 774.6, filed on Jul. 18, 2007; and German Patent DE 10 2007 053 961.6, filed on Nov. 9, 2007; all entitled "Structure for a Vehicle Seat", which are herein incorporated by reference.

BACKGROUND

The invention relates to a structure for a vehicle seat, which structure comprises rigid structure components which form cavities and comprises a foam structure which at least partially fills the cavities.

Such vehicle seats are generally known. For example, the German laid-open specification DE 102 14 476 A1 and the German laid-open specification DE 103 21 289 A1 respectively disclose a frame composed of hollow profiles and a backrest of a vehicle seat, with a foam being arranged in each case in cavities of structural elements. Furthermore, the German laid-open specification DE 10 2004 043 860 A1 and the German laid-open specification DE 197 46 164 A1 respectively disclose a backrest for a seat and a material combination having a profile which is hollow at least in sections, with a foam being arranged in cavities of structural elements. Furthermore, the German laid-open specification DE 42 08 150 A1 and the German laid-open specification DE 197 27 907 A1 respectively disclose a backrest for a vehicle seat and a method for filling cavities in workpieces or semi-finished parts. Furthermore, the German patent document DE 40 28 895 C1 and the European patent application EP 1 591 224 A1 respectively disclose a foam body for partitioning body cavities and a device and method for noise damping in cavities of vehicles. Furthermore, the patent DE 10 2006 014 538 B3 discloses the arrangement of a cable in the interior of a tube on a motor vehicle seat, and an elastic body for a line bushing is known from document DE 198 17279 A1. Furthermore, document DE 36 36 113 A1 discloses a method for forming a foamed mass in a cavity, DE patent 23 03 289 discloses a vehicle seat having a shell which supports a seat back pad, and document DE 37 14 588 A1 discloses a safety seat back beam composed of plastic.

It is disadvantageous in the known vehicle seats that, in part, the cavity is always completely filled or else only a partial filling of the cavity is aimed merely at improving the acoustic properties.

SUMMARY

The object of the present invention is therefore the targeted formation or introduction of a filling in or into a cavity of a structural element of a vehicle seat in order to improve the mechanical properties of the vehicle seat, with a very cost-effective assembly process being sought in particular.

The object is achieved by means of a vehicle seat having a backrest and having a seat part, with the backrest or the seat part having at least one structural element which has a cavity, with the cavity being formed by a base plate and at least two profiles which are cohesively connected to the base plate, with a corner region of two profiles having provided in it a filling which is introduced to influence the stability and/or the deformation behavior of the backrest and/or of the seat part, with the filling having a foam support and a foam material, with the foam material at least partially surrounding the foam support, and the foam material preferably completely surrounding the foam support. In this way, an improvement in the mechanical properties of the vehicle seat can be obtained in a simple manner in that the filling is arranged and formed such that, during the formation of the foam from the foam material (that is to say during the expansion of the foam material), firstly a good connection, in particular adhesive connection, with the inner surfaces or the inner wall of the structural element is obtained, and such that, secondly, easy insertion of the filling into the cavity is ensured, which leads to ease of assembly of the vehicle seat according to the invention.

It is also provided according to the invention that the foam material is provided so as to expand during the drying process after the painting process (for example in a drying kiln) or that the foam material expands during a temperature step (for example in a kiln) without a painting step. In this way, the foam reinforcement of the vehicle seat can be integrated quickly and in a simple manner in terms of assembly by means of one working step which is carried out in any case.

It is also preferable according to the invention for the structural element to have a corner pressed part in the corner region of second profiles. In this way, it is possible according to the invention to obtain a targeted reinforcement at highly loaded points of the vehicle seat or of the backrest and/or of the seat part.

Further subjects of the present invention relate to
- a method for producing a vehicle seat according to the invention, wherein the structural element which has the cavity is formed in a first step, wherein the still-unexpanded filling, which has the foam support and the foam material, is introduced into the cavity in a second step, and wherein a temperature step is carried out in a third step, in particular in a kiln, during which the foam material expands, with the temperature step in particular being carried out after an electrocoating process, and to
- a method for producing a vehicle seat according to the invention, wherein the still-unexpanded filling, which has the foam support and the foam material, is positioned and/or fastened relative to a part of the structural element in a first step, wherein the cavity is formed in a second step, and wherein a temperature step is carried out in a third step, in particular in a kiln, during which the foam material expands, with the temperature step in particular being carried out after an electrocoating process.

DRAWINGS

The figures schematically illustrate embodiments of the invention by way of example.

FIG. 1 schematically shows, as an example of a structural element, a seat back structure or a seat back segment of, for example, a split foldable backrest.

Figure 2:
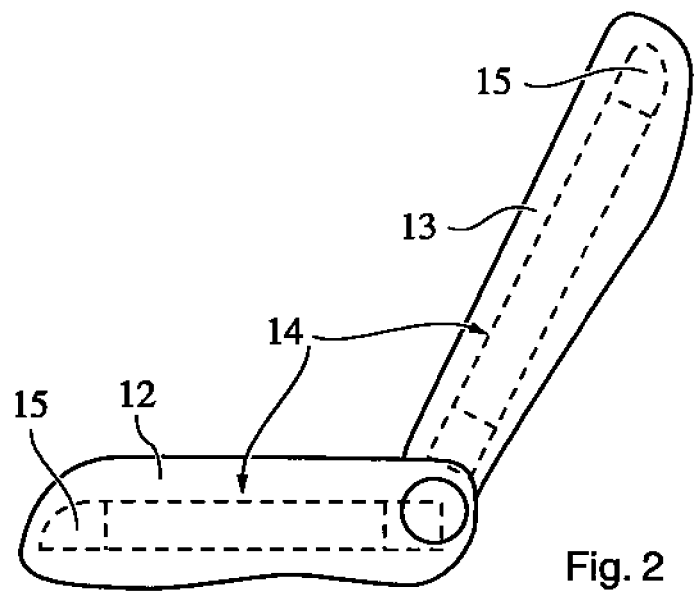
Figure 3:
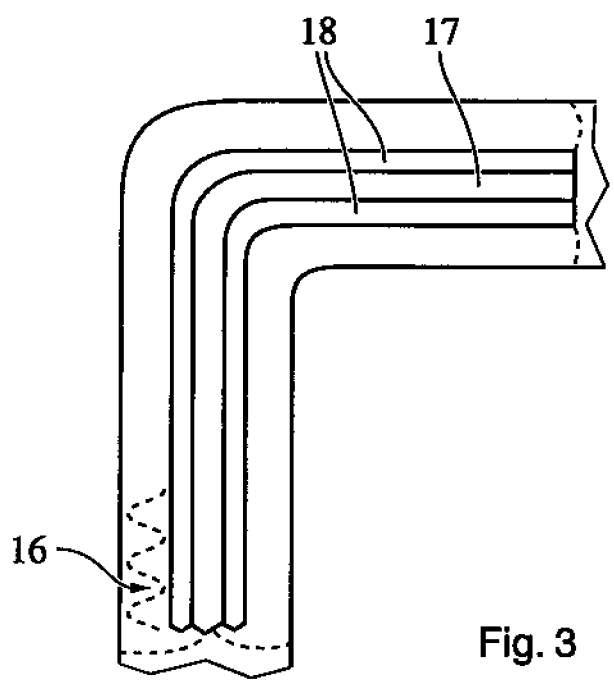

FIGS. 2 and 3 show schematic illustrations of a vehicle seat according to the invention, conforming with all of the embodiments.

DETAILED DESCRIPTION

By way of example, FIG. 1 schematically illustrates, as an example of a structural element of a vehicle seat, the rear view of a seat back segment 1 of a backrest. The seat back segment 1 or the seat back structure 1 (the figure shows only a seat back segment 1 of, for example, a split foldable backrest) comprises a base plate 2 and four U-shaped profiles 3.1 to 3.4 which are placed thereon and which, together with the base plate 2 and preferably the corner pressed parts 4 placed thereon, a rectangular frame with an encircling hollow chamber 5. The base plate 2 and the profiles 3.1 to 3.4 are composed substantially of for example metal, in particular steel or aluminum sheet, or substantially of plastic, for example glass-fiber-reinforced plastic. The profiles 3.1 to 3.4 are connected to the base plate 2 for example by welding or adhesive bonding. The connection and/or stiffening of the profiles 3.1 to 3.4 with one another or with the corner pressed parts 4 takes place according to the invention (if appropriate in addition to the welding or adhesive bonding) by means of a foam structure 6 introduced in angular form into the hollow chamber 5 in the corner regions. Said foam structure 6 stiffens the corner region by means of its inherent stiffness and/or by locally adhesively bonding the profiles 3.1 to 3.4 to one another and to the base plate 2 and/or to the corner pressed part 4. As an alternative to an embodiment with one or more corner pressed parts 4, it is also possible according to the invention for the corner pressed parts 4 to be dispensed with entirely and for the increased stability requirements in the corner region, or the higher material stresses to be absorbed by the material, to be accommodated solely by means of the profiles 3.1 to 3.4 and the foam structure 6. In this way, it is advantageously possible according to the invention to dispense with the weight and the installation space for the corner pressed parts 4.

The introduction of the foam structure 6 may take place by inserting a finished foam part, which is shaped correspondingly to the hollow chamber 5, before or during the welding of base plate 3 and profiles 3.1 to 3.4. Alternatively, the foam structure 6 is first introduced after the welding process by means of an injection of a foamable mass into the hollow chamber 5. Particularly preferable, however, is the insertion of an in particular strand-like foam precursor, which has a three-dimensional shape, into the hollow chamber 5, which foam precursor is inserted into the hollow chamber 5 before, during or after the welding process and foams to form the foam structure 6 after an activation. The activation may take place for example as a result of a supply of heat during the painting of the seat back structure 1. For this purpose, use is preferably made of rigidly cross-linking foam systems, for example based on epoxide.

The seat back structure 1 is hereby on the one hand stiffened in the region which is highly loaded in the event of an accident, and on the other hand, an additional welding of the profiles 3.1 to 3.4 to one another may be dispensed with if required.

FIGS. 2 and 3 show a vehicle seat according to the invention. A vehicle seat of said type comprises a seat part 12 and a backrest 13. Both the seat part 12 and also the backrest 13 have in each case at least one structural element 14 which, in the context of the present invention, is configured in the form of the base plate 2 and the profiles 3.1 to 3.4 or else in the form of the base plate 2, the profiles 3.1 to 3.4 and the corner pressed parts. A cavity 15 is provided at least in partial regions in said structural element 14, which cavity 15 is also referred to in the context of the present invention as a hollow chamber 5. The cavity 15 is for example in the form of a frame substantially following the outer shape or periphery of the backrest 13 or of the seat part 12, and is substantially angular, rectangular, triangular or angled in cross section. According to the present invention, at least one partial region of the cavity 15, and preferably also only one partial region of the cavity 15, has arranged in it a filling 16 which comprises a foam material 18. The filling 16 or the foam material 18 is also referred to below as a foam structure. The filling 16 or the foam material 18 may duly be injected from the outside by injecting an easily deformable or foaming material (for example through an opening in the cavity 15), but it is preferable according to the present invention for the filling 16 to be introduced into the cavity 15 in the form of a still-unexpanded and substantially hard, or at any rate substantially non-adhesive, foam material 18 which is connected to the foam support 17, or else fastened to or positioned on a structure part which forms a cavity wall, with the cavity 15 then being formed by means of a connection to another structure part. In a subsequent step, the foam material 18 is then expanded, as a result of which the foam material 18 then at least partially or preferably completely surrounds the foam support 17. To illustrate this, FIG. 3 shows a detail of a cavity 15 formed in the structural element 14, with the filling 16, that is to say the foam support 17 and the foam material 18, being illustrated in the cavity 15 in the unexpanded state of the foam material 18 by means of solid lines, and with dashed lines or dots illustrating the limit of the foam material 18 in the foamed state. According to the invention, the expansion of the foam material 18 may take place in particular by means of a KTL bath treatment (not illustrated). This is to be understood to mean a treatment in an electrocoating kiln or a cathodic dip coating process in which the structural elements 14 of the vehicle seat are raised to a temperature of for example approximately 160° to approximately 180° over for example approximately 5 minutes to approximately 15 minutes, preferably approximately 10 minutes.

The invention claimed is:

1. A vehicle seat comprising a backrest and a seat part, the backrest or the seat part having at least one structural element which has a cavity, the cavity being formed by a base plate and at least two u-shaped profiles, the at least two u-shaped profiles forming a frame substantially following a periphery of the base plate, each u-shaped profile of the at least two u-shaped profiles having the cavity extending therein, wherein the at least two u-shaped profiles are secured to the base plate by a welded joint or a bonded joint, and wherein a corner region of the frame has provided in it a filling configured to influence the stability and/or the deformation behavior of the backrest and/or of the seat part, the filling having a foam support and a foam material, the foam material at least partially surrounding the foam support.

2. The vehicle seat as claimed in claim 1, wherein the foam material completely surrounds the foam support.

3. The vehicle seat as claimed in claim 1, wherein the foam material is configured to expand in an electrocoating kiln.

4. The vehicle seat as claimed in claim 1, wherein the at least one structural element has a corner pressed part in the corner region of the frame.

5. A method for producing a vehicle seat as claimed in claim 1, comprising forming the at least one structural element which has the cavity, introducing into the cavity still-unexpanded filling comprising the foam support and the foam material, and thermally expanding the foam material.

6. The method as claimed in claim 5, wherein thermally expanding the foam material is performed after an electrocoating process.

7. The method as claimed in claim 5, wherein thermally expanding the foam material is performed in a kiln.

8. A method for producing a vehicle seat as claimed in claim 1, comprising positioning and/or fastening a still-unexpanded filling comprising the foam support and the foam material relative to a part of the at least one structural element forming the cavity, and thermally expanding the foam material.

9. The method as claimed in claim 8, wherein thermally expanding the foam material is performed in a kiln.

10. The method as claimed in claim 8, wherein thermally expanding the foam material is performed after an electrocoating process.

* * * * *